(12) United States Patent
Nicoletti et al.

(10) Patent No.: US 10,839,392 B2
(45) Date of Patent: Nov. 17, 2020

(54) SYSTEMS AND METHODS FOR USE IN PROVIDING ENHANCED AUTHENTICATION OF CONSUMERS

(71) Applicant: MASTERCARD INTERNATIONAL INCORPORATED, Purchase, NY (US)

(72) Inventors: Laurie Ann Nicoletti, White Plains, NY (US); Elisabeth Lea Rode, New York, NY (US); Janet Marie Smith, Ballwin, MO (US); Brandon Craig Bryson, Wildwood, MO (US); Sameer Tare, Ballwin, MO (US); Brian Piel, Ballwin, MO (US); Steve Hubbard, Leicester (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 475 days.

(21) Appl. No.: 15/438,488

(22) Filed: Feb. 21, 2017

(65) Prior Publication Data

US 2018/0240120 A1 Aug. 23, 2018

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06F 21/32* (2013.01); *G06Q 20/305* (2013.01); *G06Q 20/325* (2013.01); *G06Q 30/016* (2013.01)

(58) Field of Classification Search
USPC .................................................... 705/35, 44
See application file for complete search history.

(56) References Cited

U.S. PATENT DOCUMENTS 10,034,174 B1 * 7/2018 Tuomikoski ........ H04L 63/0861
2006/0106605 A1 * 5/2006 Saunders ............... G10L 17/04
704/246
(Continued)

FOREIGN PATENT DOCUMENTS

EP 2076071 A1 7/2009

OTHER PUBLICATIONS

VoltDelta http:/ fNww. voltdelta neVen/s ol uti ons/voi ce-bi om etri csivoi ce-bi om etri cs- for -cal l-centers/ (Year: 2016).*
(Continued)

*Primary Examiner* — William E Rankins
(74) *Attorney, Agent, or Firm* — Harness, Dickey & Pierce, P.L.C.

(57) ABSTRACT

Systems and methods are provided for use in enhancing security associated with services related to payment or banking accounts, in connection with communication between consumers and consumer service call centers associated with the accounts. One exemplary method includes receiving, at a computing device, a request to authenticate a consumer to a payment or banking account from a call center associated with consumer services for the account, and soliciting a biometric from the consumer. The method also includes receiving biometric data from a communication device associated with the consumer relating to the solicited biometric, and confirming the received biometric data based on reference biometric data for the consumer. The method then further includes transmitting an authentication confirmation to the call center, when the received biometric data is confirmed, whereby the call center is able to proceed in providing the consumer services to the consumer with or without security questions.

13 Claims, 5 Drawing Sheets

(51) Int. Cl.
G06F 21/32 (2013.01)
G06Q 30/00 (2012.01)
G06Q 20/30 (2012.01)

(56) References Cited

U.S. PATENT DOCUMENTS

| | | | | |
|---|---|---|---|---|
| 2006/0226951 | A1* | 10/2006 | Aull | G06F 21/32 |
| | | | | 340/5.61 |
| 2009/0023393 | A1* | 1/2009 | Behzad | H04W 12/06 |
| | | | | 455/73 |
| 2013/0254533 | A1* | 9/2013 | Welch | G06F 21/32 |
| | | | | 713/155 |
| 2014/0337635 | A1* | 11/2014 | Konvalinka | H04L 63/0861 |
| | | | | 713/186 |
| 2015/0094026 | A1 | 4/2015 | Martin | |
| 2015/0287018 | A1 | 10/2015 | Iqbal et al. | |
| 2016/0048841 | A1* | 2/2016 | Johnson | G06Q 30/01 |
| | | | | 705/304 |
| 2016/0065555 | A1* | 3/2016 | Branden | H04L 63/0807 |
| | | | | 726/7 |
| 2017/0019531 | A1* | 1/2017 | Janefalkar | H04M 3/42042 |

OTHER PUBLICATIONS

O'Gorman, L.; "Comparing passwords, tokens, and biometrics for user authentication", proceedings of the IEEE, vol. 91, No. 12; pp. 2021-2040;Dec. 1, 2003.

* cited by examiner

SYSTEMS AND METHODS FOR USE IN PROVIDING ENHANCED AUTHENTICATION OF CONSUMERS

FIELD

The present disclosure generally relates to systems and methods for providing enhanced authentication of consumers and, in particular, to systems and methods for enhancing security associated with services relating to accounts, including, for example, consumer services for such accounts provided through call centers, etc.

BACKGROUND

This section provides background information related to the present disclosure which is not necessarily prior art.

Consumers use payment accounts to purchase various different products, including goods and services, etc. The payment accounts are issued to the consumers by banking institutions, referred to as issuers. From time to time, the consumers are known to communicate with the issuers regarding their payment accounts, for example, to report lost or stolen payment devices, to inquire about balances, to change content information for the consumers and/or the payment accounts, to dispute charges, to turn on/off debit cards, to transfer funds, etc. In so doing, the consumers may communicate with the issuers through websites or mobile applications associated with the issuers, or through telephone calls to the issuers. In the former, the consumers' login credentials typically used to access the websites and/or mobile applications may be used to authenticate the consumers. And, in the latter, the consumers may be asked to provide account details and/or one or more security questions (e.g., mother's maiden name, first pet's name, etc.) to accomplish such authentication. Then, and only after the consumers are authenticated, are the issuers able to explore the consumers' reasons for communicating therewith, often with reference to confidential information about the consumers and/or their payment accounts.

DRAWINGS

The drawings described herein are for illustrative purposes only of selected embodiments and not all possible implementations, and are not intended to limit the scope of the present disclosure.

Figure 1:
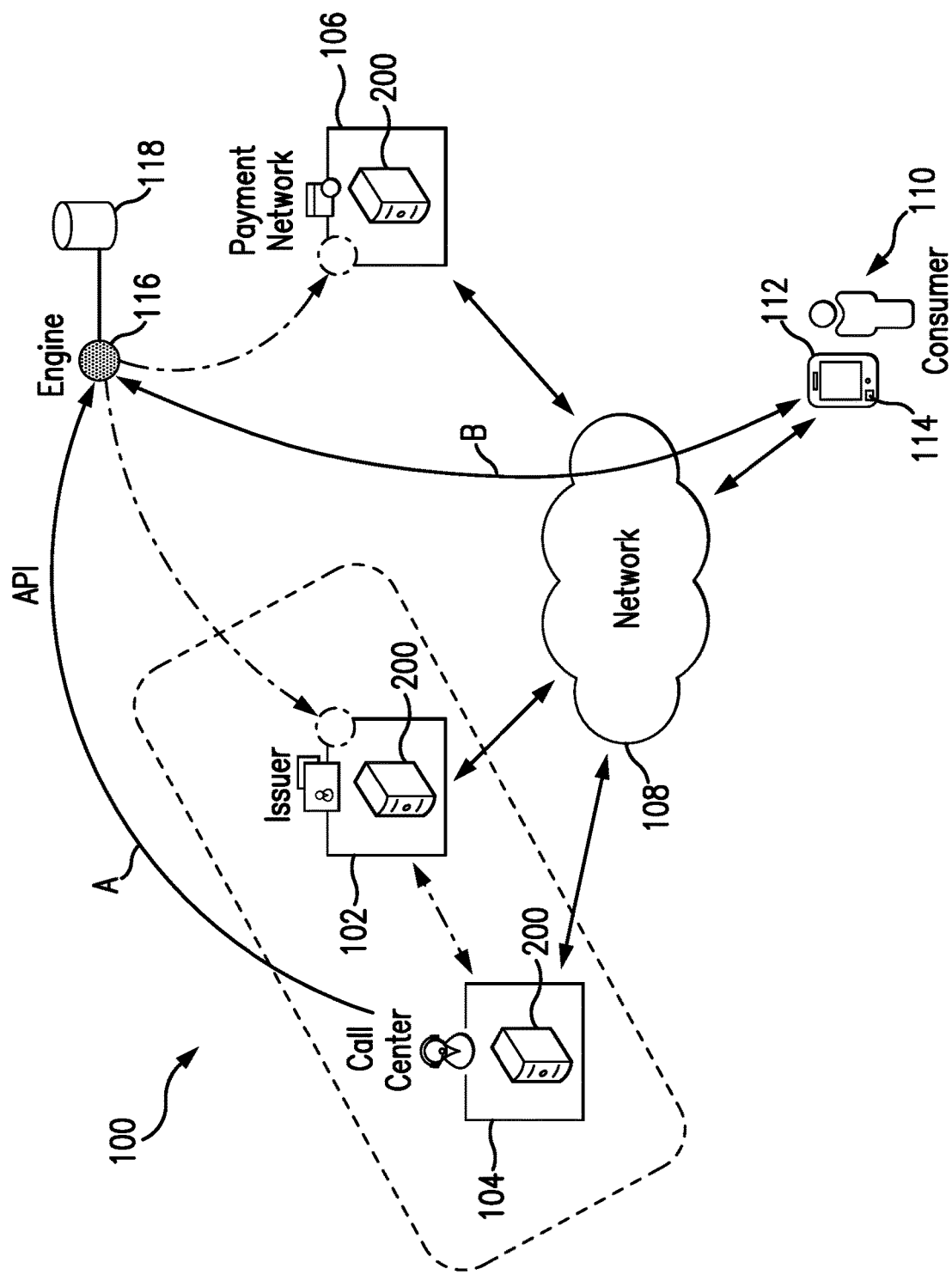
FIG. 1 is a block diagram of an exemplary system of the present disclosure suitable for use in providing enhanced authentication of consumers in connection with providing call center services to the consumers related to their accounts.
Figure 3:
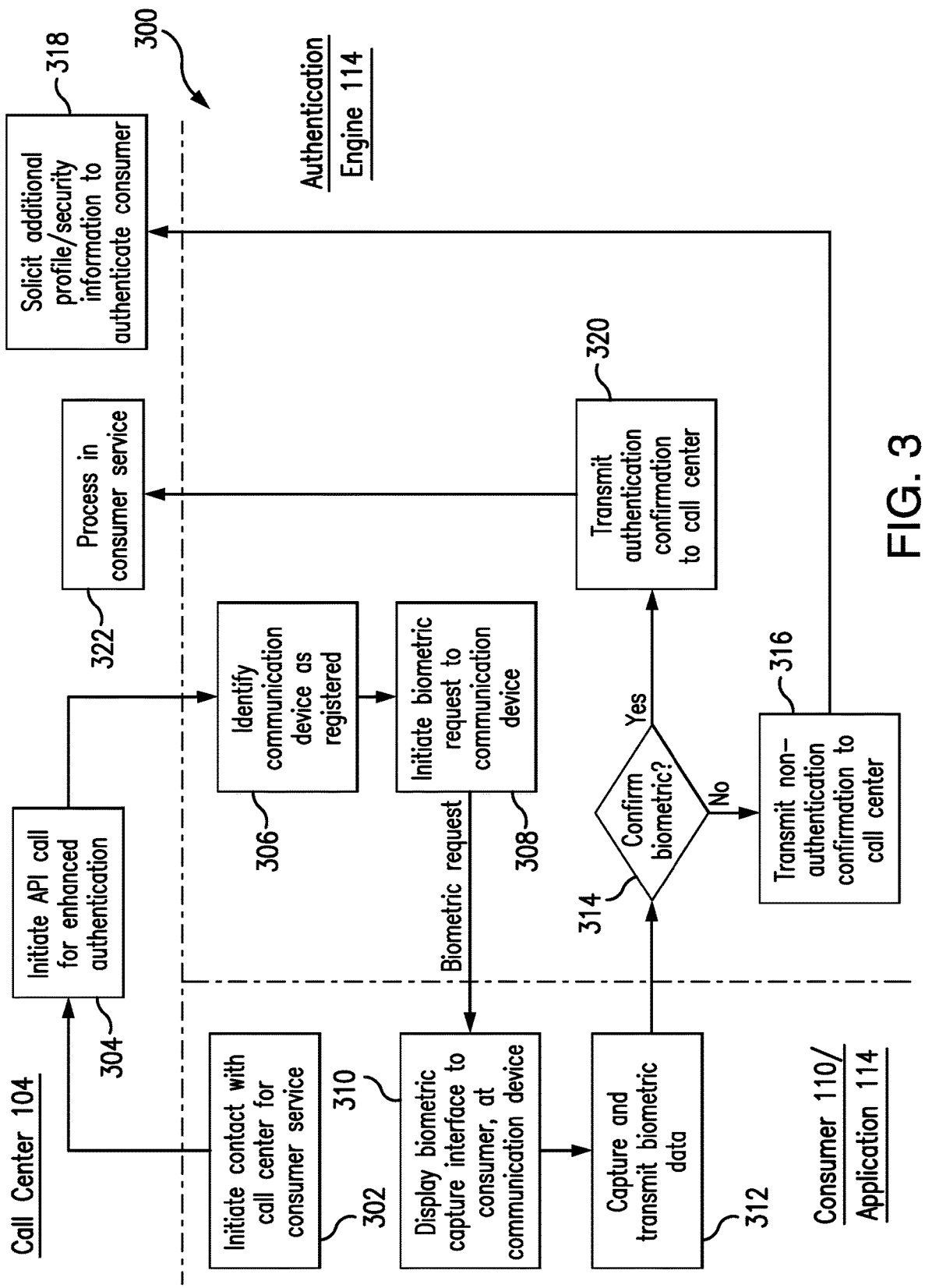
FIG. 3 is an exemplary method that may be implemented in connection with the system of FIG. 1 for providing enhanced authentication of a consumer in association with a request by the consumer for call center services related to his/her account.
Figure 4:
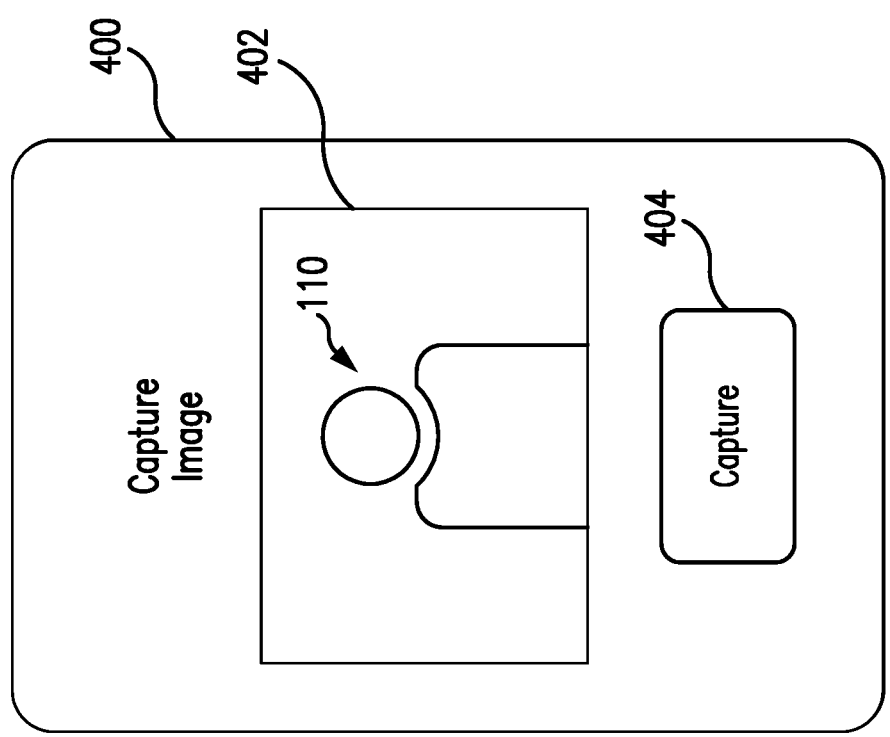
Figure 5:
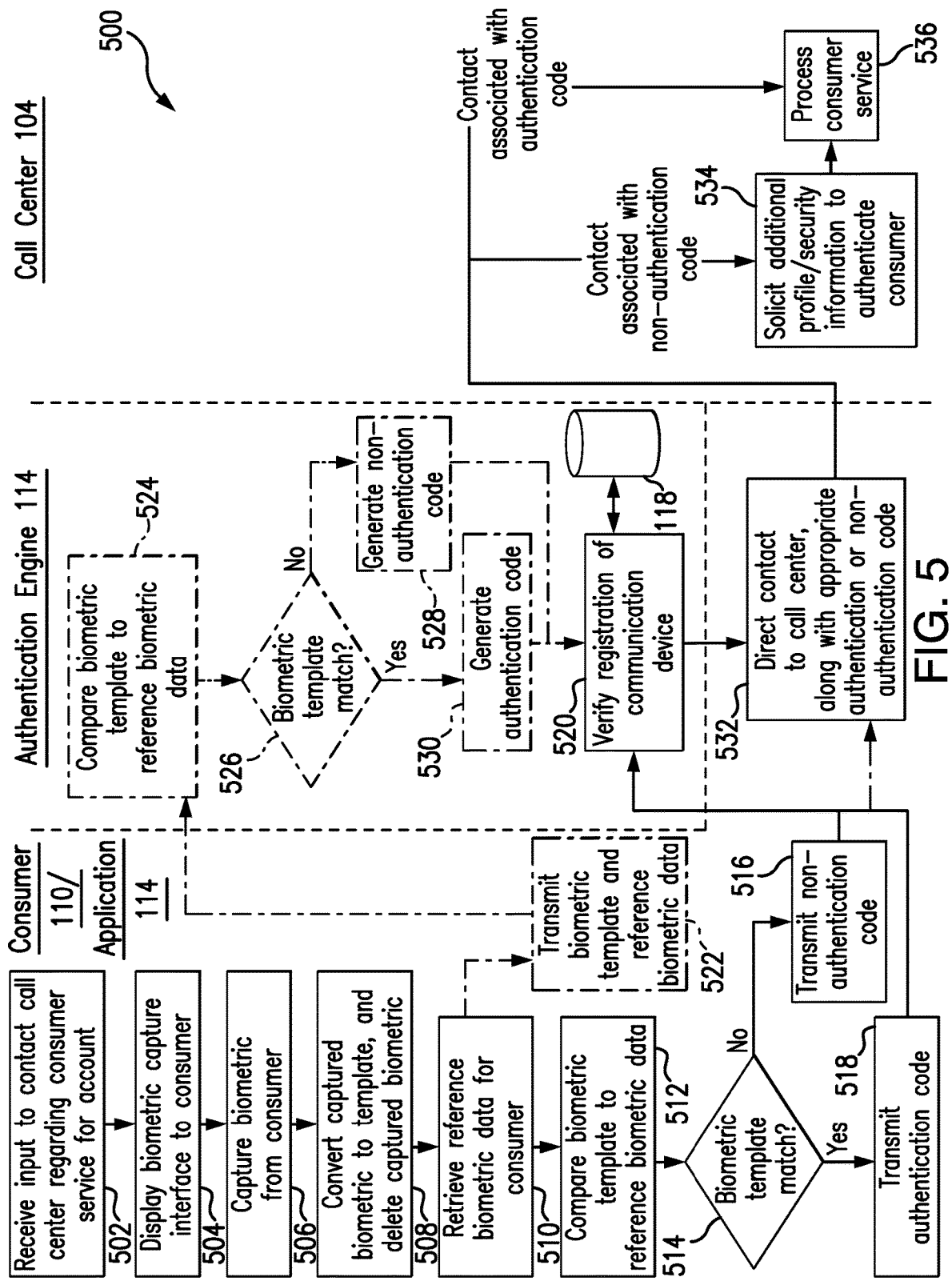

FIG. 4 is an exemplary interface that may be used in the system of FIG. 1 and/or the method of FIG. 3 to capture facial image data from a consumer for use in authenticating the consumer to an account in connection with providing call center services to the consumer for his/her account; and FIG. 5 is another exemplary method that may be implemented in connection with the system of FIG. 1 for providing enhanced authentication of a consumer in association with a request by the consumer for call center services related to his/her account.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Occasionally, consumers seek to communicate with issuers regarding accounts (e.g., payment accounts, banking accounts (including savings accounts, loan accounts, etc.), etc.) issued by the issuers to the consumers. At the outset of such communications, the issuers often seek to authenticate the consumers, typically by a series of profile and/or security questions, especially when the communications are directed to call centers. The security questions often relate to personal information of the consumers (e.g., their mothers' maiden names, first pet's names, dates of birth, etc.). As such, while the consumers are able to answer the questions to authenticate themselves, other individuals familiar with the consumers may also be able to answer the questions and gain unauthorized access to the consumers' accounts.

Uniquely, the systems and methods herein provide for enhanced authentication of the consumers in connection with, at the least, providing call center-based services to the consumers for their accounts. In particular, for example, when a consumer contacts a call center to communicate about his/her payment account (e.g., to request various consumer services from the call center regarding the account, etc.), the call center in turn contacts an authentication engine (e.g., via an application programming interface (API), etc.) to authenticate the consumer. In response, the authentication engine contacts the consumer at a particular communication device associated with the consumer, to solicit a biometric from the consumer (e.g., a fingerprint, a facial image, etc.). The consumer responds, through the communication device, with the appropriate biometric, whereupon the consumer is authenticated based on the biometric (if successfully matched to a reference biometric) and further based on possession of the communication device (i.e., based on receiving the biometric from the particular communication device). The authentication is then returned to the call center, thereby permitting the call to proceed while providing improved confidence that the individual contacting the call center is the consumer authorized to access the account and/or discuss confidential details related to the same. If the biometric is not successfully matched, however, the call may still be routed to the call center, with a code indicating that the individual has not been authenticated via biometrics, so that the call center can instead use standard profile/security questions to authenticate the individual (e.g., knowledge-based authentication, etc.). As can be seen, through this two-factor (or two-layer) approach, the authentication experience of the consumer may be enhanced and improved in an efficient manner.

FIG. 1 illustrates an exemplary system 100, in which the one or more aspects of the present disclosure may be implemented. Although the system 100 is presented in one arrangement, other embodiments may include systems arranged otherwise depending, for example, on the manner and/or means through which consumer services are offered, etc.

As shown in FIG. 1, the system 100 generally includes an issuer 102, a call center 104 that provides consumer services on behalf of the issuer 102, and a payment network 106, each coupled to (and in communication with) network 108. The network 108 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 108 may include multiple different networks, such as a private payment transaction network made accessible by the payment network 106 to the issuer 102 and, separately, an authentication network (or another dedicated network separate from the payment transaction network) for authenticating consumers as described herein (including consumer 110) and/or the public Internet, which is accessible as desired to the call center 104 and/or one or more consumers, including the consumer 110 (e.g., for communicating with the call center 104, etc.), etc.

In the illustrated system 100, the issuer 102 is a banking institution or other entity, which issues accounts for use by consumers (e.g., payment accounts, banking accounts, any other types of accounts, etc.). In this exemplary embodiment, the issuer 102 has issued a payment account, for example, to the consumer 110. In turn, the consumer 110 employs the payment account to fund transactions with merchants, for example, to purchase one or more different products or to transfer funds within a mobile banking application. The payment account may include a credit account, in which case, the issuer 102 extends credit to the consumer 110 to cover funds for the purchase transactions, with the consumer 110 then later paying the funds to the issuer 102. Or, the payment account may include a debit or prepaid account, in which, generally, funds are deposited with the issuer 102 and are debited from the payment account by the consumer 110 as the consumer 110 transacts for products. With that said, it should be appreciated that the issuer 102 may issue other accounts to the consumer 110, for example, banking accounts (e.g., savings accounts, loan accounts, etc.), etc. In addition, if should also be appreciated that the system 100 is not limited to accounts associated with banking institutions and may include accounts issued by other entities (e.g., reward accounts issued by merchants, any other accounts issued to users and for which call-center services may be provided, etc.).

In one example transaction, the consumer 110 initiates a purchase or banking transaction by presenting a payment device (e.g., a payment card, etc.) associated with his/her payment account to a merchant (not shown). In turn, the merchant communicates an authorization request for the purchase transaction to an acquirer (not shown) associated with the merchant, identifying, for example, a payment account number for the payment device and an amount of the purchase. The acquirer then communicates the authorization request to the issuer 102, through the payment network 106 (e.g., through MasterCard®, VISA®, Discover®, American Express®, etc.), to determine whether the payment account is in good standing and whether there is sufficient credit or funds to complete the purchase. If the issuer 102 accepts/approves the transaction, a reply authorizing the transaction is provided back to the acquirer and the merchant, thereby permitting the merchant to continue in the transaction. The transaction is later cleared and/or settled by and between the merchant and the acquirer, and by and between the acquirer and the issuer 102 (via appropriate agreements). If the issuer 102 declines the transaction, however, a reply declining the transaction is provided back to the merchant, thereby permitting the merchant to stop the transaction (or seek alternate funding).

In connection with the above transaction performed by the consumer 110 using his/her payment account (or in connection with any other transactions), or in connection with the payment account in general, the consumer 110 may desire to contact the issuer 102 for a variety of different reasons. For example, the consumer 110 may wish to inquire about a balance of his/her payment account or some other status or aspect of the payment account (and/or transactions thereto), or the consumer 110 may wish to request an increased credit limit or otherwise alter the terms or information associated with his/her payment account (e.g., change a mailing address for the payment account, change authorized users, request statements, etc.), or the consumer 110 may wish to apply for a loan, turn a payment device (e.g., a debit card, etc.) on/off, etc. As another example, the consumer 110 may wish to dispute a transaction, or report a lost, stolen or damaged payment device, or close the payment account. With that said, and as should be appreciated, the consumer 110 may desire to contact the issuer 102 for multiple various reason, including the exemplary reasons provided herein, or for other additional reasons (often dependent on the type of account issued to the consumer 110 (e.g., a payment account, a banking account, another account, etc.), and/or the entity that issued the account (e.g., the issuer 102, another entity, etc.).

In the illustrated embodiment, when the consumer 110 desires to contact the issuer 102, he/she is directed to contact the call center 104 associated with the issuer 102. The call center 104 in turn provides services, and in particular consumer services, for example, to address inquires and/or issues raised by the consumer 110, by providing requested information, routing the consumer 110 to the appropriate person, department, or entity, etc. As shown in FIG. 1, in the system 100, the call center 104 is separate from the issuer 102. Nonetheless, as indicated by the dotted box (and the dotted line between the issuer 102 and the call center 104), the call center 104 may be integrated with the issuer 102, in whole or in part, in various embodiments.

Generally, in connection with providing consumer services to consumers regarding their payment or banking accounts (as issued by the issuer 102, for example), the call center 104 may include multiple operators to handle voice calls from the consumers, whereby the consumers (e.g., the consumer 110, etc.) initiate calls to the call center 104 (e.g., telephone calls via telephones (e.g., via communication device 112 associated with the consumer 110, etc.), Voice over Internet Protocol (VoIP) calls via the communication device 112 (e.g., via application 114 at the communication device 112, etc.), click to talk calls from the communication device 112 (e.g., via application 114 at the communication device 112, etc.), etc.). For example, the call center 104 may include operators to handle electronic "calls" received from consumers, for example, via a "contact us" link in a network-based application associated with the issuer 102, which may give rise to a VoIP call, live chat or other form of electronic interaction with the consumers. Once contacted, the call center 104, and more specifically, the operators (e.g., whether persons and/or automatons, etc.) associated with the call center 104, communicate with the consumers to address their particular reasons for contacting the call center 104. In at least one embodiment, a call center operator may be automated (e.g., may include interactive voice response (IVR) technology), in whole or in part, to interact with consumers and, further, may be linked to frequently asked question (FAQ) content associated with the issuer 102.

With continued reference to FIG. 1, the consumer 110 is associated with the communication device 112, which, in this exemplary embodiment, is a portable communication device (e.g., a smartphone, a tablet, a laptop, etc.). As described, the communication device 112 may be used by the consumer 110 to initiate a consumer service call to the issuer 102, and in particular, to the call center 104 (e.g., a phone call, a VoIP call, etc.). The communication device 112 includes one or more unique identifiers, such as, for example, a media address control (MAC) address (broadly, a physical address or a hardware address), a mobile identification number (MIN), etc., which is linked/associated with the consumer's biometric registration/account (e.g., during enrollment of the consumer 110 as described herein, etc.). Further, in this exemplary embodiment, the communication device 112 includes application 114, which configures the communication device to operate as described herein. When the communication device 112 is described as performing such operations herein, it should be appreciated that it is the application 114 or other applications, generally, which cause the communication device 112 to do so (in coordination with the application 114 or other applications, even if the application 114 or other applications are not specifically referenced), or not. And, when installed, the application 114 further includes an identifier, such as, for example, an application identifier, or ID, which is unique to the application 114 as installed at the communication device 112. The application 114 will be described in more detail hereinafter.

While only one issuer 102, one call center 104, one payment network 106, one consumer 110, and one communication device 112 are illustrated in FIG. 1, it should be appreciated that any number of these parts (and their associated components) may be included in the system 100, or may be included as a part of systems in other embodiments, consistent with the present disclosure. Often, the call center 104 will provide support for hundreds if not thousands of different consumers, with multiple call centers implemented for providing such support.

Figure 2:
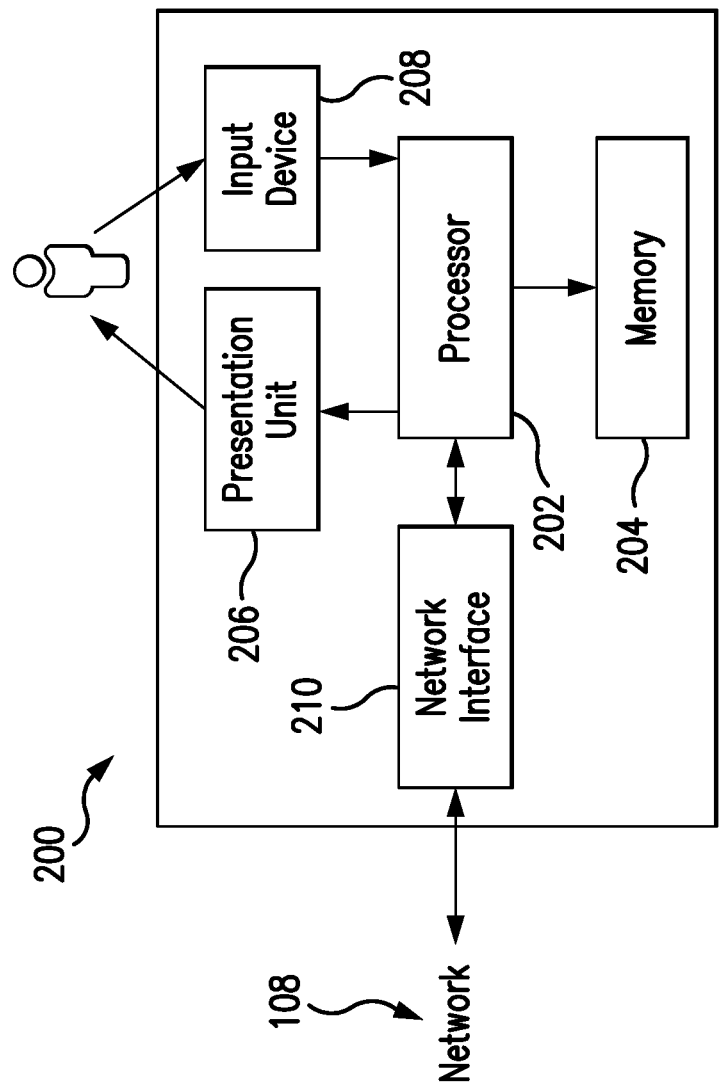
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the issuer 102, the call center 104, and the payment network 106 are illustrated as including, or being implemented in, computing device 200, coupled to (and in communication with) the network 108. In addition, the communication device 112 associated with the consumer 110 can also be considered a computing device consistent with computing device 200 for purposes of the description herein. The system 100, however, should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, white listed communication devices, consumer profiles, biometric data, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is identifying and/or presenting purchase options to the consumer 110. It should be appreciated that the memory 204 may include a variety of different memories, each implemented in one or more of the functions or processes described herein.

In addition, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information to (e.g., instructions for providing biometrics, indicators (e.g., codes, etc.) of successful authentication or not, etc.) and/or solicits information from (e.g., biometrics, etc.), either visually or audibly, a user of the computing device 200, for example, the consumer 110 in the system 100, etc. It should be appreciated that various interfaces (e.g., network-based applications such as application 114, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, profile information and biometrics from the consumer 110, etc. The input device 208 is coupled to (and is in communication with) the processor 202 and may include, for example, a keyboard, a fingerprint scanner, a camera, a pointing device, a mouse, a stylus, a touch sensitive panel (e.g., a touch pad or a touch screen, etc.), other biometric input devices, another computing device, and/or an audio input device. In various exemplary embodiments, a touch screen, such as that included in a tablet, a smartphone, or similar device, behaves as both a presentation unit and an input device.

Further, the illustrated computing device 200 includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 108. In some exemplary embodiments, the computing device 200 includes the processor 202 and one or more network interfaces incorporated into or with the processor 202.

Referring again to FIG. 1, the system 100 also includes an authentication engine 116, which is configured, by computer-executable instructions, to operate as described herein. The authentication engine 116 is illustrated as a standalone part of the system 100 and, as such, may be implemented in and/or associated with a computing device consistent with the computing device 200. However, as indicated by the dotted lines, the authentication engine 116 may be incorporated, in whole or in part, into the issuer 102 and/or the payment network 106. In addition, in still other embodiments, the authentication engine 116 may be incorporated, at least partly, elsewhere in the system 100, or in other parts/entities not shown.

In this exemplary embodiment, the system 100 includes a data structure 118 comprising consumer profiles for multiple consumers (including the consumer 110), as generally registered to the application 114 and/or the authentication engine 116 herein, for example. The data structure 118 may be included, for example, in memory (e.g., memory 204, etc.) of the authentication engine 116, or it may be included elsewhere in the system 100, etc. In connection therewith, the data structure 118 may include biometric data (e.g., reference biometric data, etc.) for the multiple consumers (e.g., as part of their profiles, etc.). The biometric data may include data indicative of, without limitation, fingerprints, facial images, palm prints, retina images, voice recordings, etc. Alternatively, however, the biometric data for the multiple consumers may be included at their communication devices and accessed, as desired, for use as described herein (e.g., reference biometric data for the consumer 110 may be included at his/her communication device 112 in memory 204, etc.). In addition, it should be appreciated that the consumer profile may also include data related to the consumers (e.g., name, email address, etc.) as well as different biometrics for the consumers (e.g., fingerprint and facial image, etc.). Further, the data structure 118 may include (e.g., as part of the consumer profiles, etc.) a listing of payment accounts associated with the consumers (and issued by the issuer 102), and/or a listing of communication devices (e.g., a listing of identifiers for the communication devices, etc.) linked with each of the payment accounts and/or each of the registered consumers (e.g., a white list of communication devices registered to the application 114 and/or the authentication engine 116 (broadly, registered devices), etc.).

The information in the data structure 118 (including the consumer profiles, the biometric data (when included) and the data relating to the consumers' communication devices) may be collected from the consumers at any desired time. For example, the information may be collected from the consumers as part of providing/registering the consumers for their payment or banking accounts (e.g., when the issuer 102 initially issues the accounts to the consumers, etc.). Or, the information may be collected from the consumers as part of opting into (or enrolling for) implementation of the enhanced authentication services described herein, with the issuer 102 and/or the payment network 106, for example. Still further, the information may be collected from the consumers as part of installing related applications to their communication devices (e.g., application 114, etc.), and configuring the applications for use as described herein (e.g., registration of the consumers may take place upon configuring the applications, etc.).

Further, generally in the system 100, when the consumer 110 desires assistance with his/her payment account, for example, the consumer 110 contacts the call center 104 (or initiates a contact to the call center 104). As described above, this may include a voice and/or electronic call provided via his/her communication device 112, or other computing device 200, or this may include a conventional telephone call, or otherwise, etc. In any case, in one aspect of the system 100, in response to the "call," the call center 104 is configured to interact with the authentication engine 116, for example, via an application programing interface (API) exposed by the authentication engine 116 (as indicated by arrow A in FIG. 1), etc., to request authentication of the consumer 110.

In turn, the authentication engine 116 is configured to receive the authentication request from the call center 104, via the API. The authentication request may include a name/ID of the issuer 102 (associated with the consumer's payment account in this example), a name of the consumer 110, a payment account identifier for the consumer's payment account (e.g., a PAN, etc.), a communication device identifier (associated with communication device 112), an application ID for the application 114 at the consumer's communication device 112 (e.g., when the consumer utilizes the application 114 to contact the call center 104, or otherwise, etc.), or other information indicative of the consumer 110 and/or the consumer's payment account.

The authentication engine 116 is configured to then identify the consumer's communication device 112, based on information in the authentication request. This may be done directly, when an identifier for the communication device 112 is included in the authentication request. Or, this may include searching in the data structure 118 for the communication device 112, based on other information in the authentication request. Regardless, in turn, the authentication engine 116 cooperates with the consumer's identified communication device 112, and in particular the application 114 therein, to solicit a biometric from the consumer 110. In response, the consumer 110 utilizes the communication device 112, and the application 114, to capture the requested biometric, to convert it to a template, and/or to encrypt and transmit it (e.g., to transmit the captured biometric, biometric data associated with the captured biometric, etc.) to the authentication engine 116 (as indicated by arrow B in FIG. 1). The authentication engine 116 is configured to then retrieve reference biometric data for the consumer 110 (e.g., from the consumer's profile in the data structure 118, from memory 204 at the consumer's communication device 112, etc.), compare the reference biometric data to the received biometric data, and if there is a successful match, to return an authentication confirmation to the call center 104 (e.g., an authentication code, etc.). As can be seen, because the matching biometric is received from the consumer 110 via the consumer's identified communication device 112, a two-factor (or two-layer) approach is provided to authenticate the consumer 110.

Upon receipt of the authentication confirmation for the consumer 110 from the authentication engine 116 (when the authentication confirmation indicates that the consumer 110 is authenticated), the call center 104 is permitted to proceed in handling the communication with the consumer 110 accordingly (e.g., the phone call, the chat, or other interaction, etc.). Conversely, when the reference biometric does not successfully match the received biometric from the consumer 110 for any one of various different reasons (e.g., the received biometric from the consumer 110 is of poor quality, the received biometric simply does not match the reference biometric, etc.), the authentication engine 116 is configured to transmit a non-authentication confirmation to the call center 104 (e.g., a non-authentication code, etc.). In response, the call center 104 may still be permitted to proceed in handling the communication with the consumer 110, but may additionally proceed to ask the consumer 110 various standard profile/security questions in order to authenticate the consumer 110, prior to actually handling the communication with the consumer 110.

Alternatively, in another aspect of the system 100, in response to the "call" by the consumer 110 to the call center 104, when initiated at the consumer's communication device 112 (and prior to actually directing the "call" to the call center 104), the application 114 at the communication device 112 may prompt the consumer 110 for his/her biometric (whereby various ones of the operations of the authentication engine 116 are incorporated in the application 114). In response, the consumer 110 utilizes the communication device 112, and the application 114, to capture the requested biometric, to convert it to a template, and/or to encrypt and transmit it (e.g., to transmit the captured biometric, biometric data associated with the captured biometric, etc.) to the authentication engine 116 (as generally indicated by arrow B in FIG. 1). The authentication engine 116 is configured to then retrieve reference biometric data for the consumer 110 (e.g., from the consumer's profile in the data structure 118, from the communication device 112, etc.), and compare the reference biometric data to the received biometric data. If there is a successful match, the authentication engine 116 is configured to then verify that the communication device 112 is registered with the application 114 and/or the authentication engine 116 (e.g., search in the data structure 118 for an indicator associated with the communication device 112 to determine if the communication device 112 is present in the data structure 118 (and thus registered), etc.). Then, when the consumer 110 is biometrically authenticated (and when the consumer's communication device 112 is registered), the authentication engine 116 is configured to transmit an authentication confirmation to the call center 104, as described above, and direct the consumer's "call" to the call center 104 for processing. However, if there is not a successful biometric match or if the consumer's communication device 112 is not verified, the communication device 112 and/or the authentication engine 116 is configured to return a non-authentication confirmation to the call center 104, as also described above, along with directing the "call" to the call center 104 (indicating to the call center 104 that the consumer 110 still needs to be authenticated).

Further in the system 100, in various embodiments, it is contemplated that once the consumer 110 captures the requested biometric at the communication device 112, via the application 114, for example, or otherwise, the communication device 112 (and/or the application 114) may be configured to then retrieve reference biometric data for the consumer 110 (e.g., from the consumer's profile in the data structure 118, from memory 204 at the consumer's communication device 112, etc.), compare the reference biometric data to the received biometric data, and if there is a successful match, to either return an authentication confirmation to the call center 104 (e.g., an authentication code, etc.) as described above, and/or directly route the consumer's "call" to the call center 104 (whereby various ones of the operations of the authentication engine 116 described herein are again incorporated in the application 114).

FIG. 3 illustrates an exemplary method 300 for providing enhanced authentication of a consumer in association with a request by the consumer for call center services related to his/her payment or banking account. The exemplary method 300 is described with reference to the system 100 of FIG. 1, for example, and as implemented in the authentication engine 116 thereof (in association with the application 114 at the consumer's communication device 112), with additional reference to the computing device 200. However, it should be understood that the method 300 is not limited to the system 100 or the computing device 200, as it may be implemented in other systems and/or in other computing devices. Likewise, the systems and the computing devices herein should not be understood to be limited to the exemplary method 300.

As shown in FIG. 3, initially in the method 300, when the consumer 110 desires assistance with his/her account, the consumer 110 contacts the call center 104, at 302, in connection with requesting one or more consumer services. As described above, this may be done via the consumer's communication device 112, as a phone call to the call center 104 or via the application 114 (through a "contact us" button) at the communication device 112. Or, this may be done via a phone call from a different phone, or via a "contact us" link in a network-based application associated with the issuer 102 (e.g., a website provided by the issuer 102, etc.). The consumer services requested by the consumer 110 may include or relate to any desired services relating to the consumer's account, including, for example, balance inquiries, transaction inquiries, transaction disputes, credit limit increases, changes in personal information, technical support with the application 114, etc.

In response to the consumer's contact, the call center 104 initiates an API call for enhanced authentication of the consumer, at 304. In connection therewith, the call center 104 transmits an authentication request to the authentication engine 116, via the API, to authenticate the consumer 110. As described above, the authentication request includes information that may be used by the authentication engine 116 to identify the consumer 110 and/or the consumer's account. Then, once the consumer 110 and/or the account is/are identified, the authentication engine 116 identifies the consumer's communication device 112, at 306, as associated with the consumer's account (and/or the consumer 110) (e.g., identifies an identifier such as a MAC address, etc. for the consumer's communication device 112; etc.).

Next, the authentication engine 116 transmits a biometric request to the consumer 110, at 308, at his/her identified communication device 112 (e.g., via the API, etc.). In so doing, the authentication engine 116 cooperates with the consumer's communication device 112, and in particular, the application 114 therein, to solicit a biometric from the consumer 110 via the application 114. In turn, the consumer's communication device 112 (via the application 114) receives the biometric request and displays a biometric capture interface to the consumer 110, at 310 (e.g., at the presentation unit 206, etc.). The communication device 112 then receives an input (e.g., from the consumer 110, etc.) to capture the biometric. And, at 312, the communication device 112 actually captures the requested biometric from the consumer 110, and transmits the captured biometric to the authentication engine 116.

With that said, FIG. 4 illustrates an example interface 400 that may be displayed to the consumer 110 at his/her communication device 112 (e.g., in connection with operation 310 of method 300, etc.) for use in soliciting an image of the consumer's face, in this example, in association with the biometric request. As shown, the interface 400 generally includes a camera view section 402, and a capture button 404. As such, to capture the image of the consumer's face, the consumer 110 initially positions his/her face in the camera view section 402. Then, when the consumer's face is properly positioned, the consumer 110 actuates the capture button 404 to capture an image of his/her face. In various embodiments, the interface 400 may also include on-screen prompts to help the consumer 110 successfully capture the image of his/her face (e.g., to help the consumer 110 capture an image that can be successfully compared to a reference image, etc.). Such prompts may include, for example, indicators that lighting is either good or bad (e.g., lighting is too dim, etc.), that facial expressions should be changed (e.g., don't smile, etc.), etc.

With reference again to FIG. 3, upon receiving the captured biometric from the consumer 110, the authentication engine 116 confirms the biometric, at 314. For example, the authentication engine 116 may search in the data structure 118 for the consumer's reference biometric and, when found, compare the captured biometric to the reference biometric.

The confirmation of the received biometric (e.g., the comparison of the captured biometric to the reference biometric, etc.) may be done via any suitable algorithm, for example, depending on the particular biometric being compared (e.g., utilizing biometric feature extraction and template generation and comparison (where the templates represent the biometrics reduced to zeros and ones, as is generally known, with the comparison then involving a string comparison thereof), etc.). What's more, the comparison may require an exact match, or the comparison may require a match within an acceptable confidence range (e.g., depending on the algorithm, depending on the particular biometric, etc.). In particular, for example, principal components analysis (PCA), linear discriminant analysis (LDA), elastic bunch graph matching (EBGM), independent component analysis (ICA), evolutionary pursuit (EP), kernel methods, the trance transform, an active appearance model (AAM), a 3-D morphable model, 3-D face recognition, the Bayesian framework, hidden Markov Models (HMMs), the GaussianFace face recognition algorithm, FaceNet, etc. may be used to compare facial images; minutiae-based matching, pattern matching, etc. may be used to compare fingerprints; IrisCode® comparison may be used to compare retina scans; minutiae-based matching, correlation-based matching, ridge-based matching, etc. may be used to compare palm prints; etc.

When the captured biometric does not match the reference biometric for the consumer 110, and the consumer is not confirmed at 314, the authentication engine 116 transmits a notification to the call center 104, at 316, indicating that the consumer 110 is not authenticated. Upon receipt of the notification, the call center 104 then solicits additional profile/security information from the consumer 110, at 318, in order to authenticate the consumer 110, prior to actually handling the contact with the consumer 110. And, when the consumer 110 is authenticated, based on the additional profile/security information, the call center 104 is permitted to proceed in handling the communication with the consumer 110 and processes the appropriate consumer service (s), at 320. Alternatively, in some embodiments, upon receipt of the non-authentication notification, the call center 104 may be permitted to simply terminate the consumer's contact.

Conversely when the captured biometric matches the reference biometric, and the consumer 110 is confirmed at 314, the authentication engine 116 transmits an authentication confirmation to the call center 104, at 322, indicating that the consumer 110 is authenticated (e.g., without having to ask any additional profile/security questions, etc.). Upon receipt of the authentication confirmation, the call center 104 is permitted to proceed in handling the communication with the consumer 110, and processes the appropriate consumer service(s), at 320. As described above, because the captured biometric (which matches the consumer's reference biometric) is received from the consumer 110 via the consumer's identified communication device 112, a two-factor (or two-layer) approach is provided to authenticate the consumer 110.

FIG. 5 illustrates an exemplary method 500 for providing enhanced authentication of a consumer in association with a request by the consumer for call center services related to his/her payment or banking account. The exemplary method 500 is described with reference again to the system 100 of FIG. 1 (with various ones of the operations of the authentication engine 116 described herein being incorporated in whole or in part in the application 114, such that they may be viewed as performed by either the authentication engine 116 or the application 114), and with additional reference to the computing device 200. However, it should be understood that the method 500 is not limited to the system 100 or the computing device 200, as it may be implemented in other systems and/or in other computing devices. Likewise, the systems and the computing devices herein should not be understood to be limited to the exemplary method 500.

As shown in FIG. 5, initially in the method 500, when the consumer 110 desires assistance with his/her account, the consumer 110 initiates a contact (or "call") with the call center 104, in connection with requesting one or more consumer services. In particular in the method 500, this is done via the application 114 at the communication device 112, in which the application 114 receives an input from the consumer 110, at 502, indicating that the consumer 110 desires to contact the call center 104. For example, upon accessing the application 114, the consumer 110 may select a "contact us" button for the call center 104.

In response (and prior to actually contacting the call center 104), the communication device 112 (via the application 114) solicits a biometric from the consumer 110 (e.g., via the interface 400 shown in FIG. 4, etc.). In turn, the consumer's communication device 112 (via the application 114) displays a biometric capture interface to the consumer 110, at 504 (e.g., at the presentation unit 206, etc.). The communication device 112 then receives an input (e.g., from the consumer 110, etc.) to capture the biometric. And, at 506, the communication device 112 actually captures the requested biometric from the consumer 110.

Next in the method 500, upon receiving the captured biometric from the consumer 110, the captured biometric is confirmed (or not). In so doing, the communication device 112 initially converts the captured biometric to a template (and deletes/destroys the actual captured biometric from the communication device 112), at 508. In addition, the communication device 112 retrieves reference biometric data for the consumer 110, at 510, for example, from memory (e.g., from memory 204, etc.) at the communication device 112 or, alternatively, from the data structure 118 (e.g., when the reference biometric data is not stored at the communication device 112, etc.), at 510. Then, at 512, in one implementation of the illustrated method 500, the communication device 112 compares the biometric template to the retrieved reference biometric data (e.g., to a corresponding template for the reference biometric data, etc.). The comparison may be done via any suitable algorithm, for example, depending on the particular biometric being compared.

When the captured biometric for the consumer 110 is not confirmed, at 514, such as, for example, when the captured biometric does not match the reference biometric for the consumer 110 or when the captured biometric is not sufficiently clear to allow for matching, etc., the communication device 112 transmits a non-authentication code to the authentication engine 116, at 516, indicating that the consumer 110 is not authenticated. Conversely, when the captured biometric for the consumer 110 is confirmed, at 514, the communication device 112 transmits an authentication code to the authentication engine 116, at 518, indicating that the consumer 110 is biometrically authenticated.

In either case, upon receiving the particular code, the authentication engine 116 next verifies, at 520, that the communication device 112 from which the code was received is registered with the application 114 and/or the authentication engine 116. In particular, for example, in connection with receiving the code from the communication device 112, the authentication engine may also receive an indicator for the communication device 112 (e.g., a MAC address for the communication device 112, a MIN for the communication device 112, etc.) and/or an indicator for the consumer's account (e.g., a PAN, etc.). In turn, the authentication engine 116 may then search in the data structure 118 for the indicator and, when found, verify that the communication device 112 is registered (at 520). When the communication device 112 is not verified, however (e.g., when the communication device 112 is not present in the data structure 118, etc.), the method 500 may end or the authentication engine 116 may modify the code received from the communication device 112 to further indicate that the communication device 112 is not verified. In various implementations of the method 500, the authentication engine 116 may alternatively verify registration of the communication device 112, at 520, prior to the application 114 generating the non-authentication code at 516 and/or prior to generating the authentication code at 518 (such that the respective codes are not generated by the application 114 until after the communication device 112 is verified by the authentication engine 116, and potentially further not until after the application 114 receives notification from the authentication engine 116 that the communication device 112 is verified). In addition in these various implementations, the application 114, then, may not transmit the corresponding code to the authentication engine 116, and instead may simply transmit the corresponding code to the call center 104 in connection with directing the contact to the call center, at 532 (as described more hereinafter, and as indicated by the dotted line in FIG. 5 between operations 516/518 and operation 532).

In another implementation of the method 500, as indicated by the dotted lines in FIG. 5, the communication device 112 (via the application 114) may transmit the biometric template for the captured biometric of the consumer 110 (generated at 508) and the reference biometric data for the consumer 110 (retrieved at 510) to the authentication engine 116, at 522. Or, the communication device 112 may simply transmit the biometric template for the captured biometric of the consumer 110 (generated at 508) to the authentication engine 116, at 522, and the authentication engine 116 may retrieve the reference biometric data for the consumer 110 (e.g., from the data structure 118, etc.) as necessary. In either case, the authentication engine 116 then determines if the biometric template is confirmed, or not. In particular in this implementation, and as generally described above, the authentication engine 116 compares the biometric template to the retrieved reference biometric data, at 524. The comparison may again be done via any suitable algorithm, for example, depending on the particular biometric being compared.

When the captured biometric for the consumer 110 is not confirmed by the authentication engine 116, in this implementation of the method 500, at 526, such as, for example, when the captured biometric does not match the reference biometric for the consumer 110 or when the captured biometric is not sufficiently clear to allow for matching, etc., the authentication engine 116 generates a non-authentication code, at 528, indicating that the consumer 110 is not biometrically authenticated. Conversely, when the captured biometric for the consumer 110 is confirmed, at 526, the authentication engine 116 generates an authentication code, at 530, indicating that the consumer 110 is biometrically authenticated. In either case, upon receiving the particular code, the authentication engine 116 then verifies, at 520, that the communication device 112 from which the code was received is registered with the application 114 and/or the authentication engine 116, or not, as described above. In various implementations of the method 500, the authentication engine 116 may alternatively verify registration of the communication device 112, at 520, prior to generating the non-authentication code at 528 and/or prior to generating the authentication code at 530, when such codes are generated by the authentication engine 116 (such that the respective codes are not generated until after the communication device 112 is verified).

Then in the illustrated method 500 (in either of the above implementations), the application 114 directs the consumer's requested contact (i.e., the "call") to the call center 104, at 532, along with the corresponding code (e.g., along with the authentication code, the non-authentication code, the modified code based on the communication device 112 being unverified, etc.). Alternatively, in various other implementations of the method 500, the authentication engine 116 may direct the consumer's requested contact (i.e., the "call") to the call center 104, at 532 (such that operation 532 is actually performed by the authentication engine 116), along with the corresponding code, upon verifying that the communication device 112 is registered.

When the consumer 110 is not authenticated (i.e., when the call center 104 receives a non-authentication code) and/or when the consumer's communication device 112 is not verified, in the method 500, in connection with the requested contact by the consumer 110, the call center 104 solicits additional profile/security information from the consumer 110, at 534 (e.g., performs a traditional knowledge-based authentication, etc.), in order to authenticate the consumer 110, prior to actually handling the contact with the consumer 110. And then, when the consumer 110 is authenticated, based on the additional profile/security information, the call center 104 is permitted to proceed in handling the communication with the consumer 110 and processes the appropriate consumer service(s), at 536 (otherwise, the contact may be terminated). However, when the consumer 110 is authenticated (i.e., when the call center 104 receives an authentication code) and when the consumer's communication device 112 is verified, the call center 104 is permitted to directly proceed in handling the contact with the consumer 110, and processes the appropriate consumer service(s), at 536, without having to ask any additional profile/security questions, etc.

In view of the above, the systems and methods herein provide for enhanced authentication of consumers in connection with, at the least, providing call center-based services to the consumers for their accounts. In particular, a biometric is received from a consumer, via a communication device associated with the consumer (and registered for the consumer), and compared to a reference biometric for the consumer (e.g., stored at the communication device, stored apart from the communication device at a separate data structure, etc.). When the biometrics match, the consumer is authenticated so that the desired call-center based services can be provided (without use of additional security questions). As such, the systems and methods herein generally provide a two-factor (or two-layer) approach to such authentication, whereby the experience of the consumer with regard to the call center-based services may be enhanced and improved in an efficient manner.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request to authenticate a consumer to an account in connection with proceeding, or not, in providing one or more consumer services to the consumer regarding the account; (b) soliciting a biometric from the consumer, at a communication device associated with the consumer, wherein the communication device is configured to display an interface to the consumer in response to the solicitation to capture the biometric; (c) receiving biometric data, as captured by the communication device, relating to the solicited biometric; (d) confirming the received biometric data based on reference biometric data for the consumer; and (e) transmitting an authentication confirmation to the call center, when the received biometric data is confirmed, whereby the call center is able to proceed in providing one or more of the consumer services to the consumer without soliciting additional security and/or account information from the consumer.

As will be also appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving an input from a consumer to contact a call center regarding one or more consumer services for an account associated with the consumer; (b) displaying an interface to the consumer for use in capturing a biometric from the consumer; (c) receiving a biometric from the consumer via the interface; (d) transmitting an authentication confirmation to the call center when the received biometric matches reference biometric data for the consumer, whereby the call center is able to proceed in providing the one or more consumer services to the consumer without soliciting additional security and/or account information from the consumer; (e) transmitting a non-authentication confirmation to the call center when the received biometric does not match the reference biometric data for the consumer, whereby the call center is able to solicit additional security and/or account information from the consumer prior to proceeding in providing the one or more consumer services to the consumer; (f) contacting the call center in connection with transmitting the authorization confirmation and/or the non-authorization confirmation to the call center; and (g) generating the authorization confirmation and/or the non-authorization confirmation when the computing device is verified as being included in a data structure of registered devices.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for authenticating a consumer in connection with facilitating a contact by the consumer with a call center for providing one or more consumer services to the consumer regarding an account associated with the consumer, the method comprising:
   receiving, by a portable computing device, a request from a consumer to contact a call center regarding one or more consumer services for an account associated with the consumer;
   in response to the request, and prior to initiating the contact, displaying, by the portable computing device, an interface to the consumer for use in capturing a biometric from the consumer;
   receiving, by the portable computing device, a biometric from the consumer via the interface;
   retrieving, by the portable computing device, reference biometric data from a memory of the portable computing device;
   comparing a biometric template based on the biometric received from the consumer to the reference biometric data; and
   in response to the biometric template matching the reference biometric data for the consumer, contacting the call center and transmitting, by the portable computing device, an authentication confirmation to the call center whereby the call center is able to proceed in providing the one or more consumer services to the consumer without soliciting additional security and/or account information from the consumer.

2. The method of claim 1, further comprising contacting the call center and transmitting, by the portable computing device, a non-authentication confirmation to the call center when the biometric template does not match the reference biometric data for the consumer, whereby the call center is able to solicit additional security and/or account information from the consumer prior to proceeding in providing the one or more consumer services to the consumer.

3. The method of claim 1, further comprising converting, by the portable computing device, the received biometric to the biometric template, and deleting the received biometric.

4. The method of claim 1, wherein contacting the call center and transmitting the authentication confirmation to the call center includes contacting the call center and transmitting the authentication confirmation to the call center further in response to a verification that the portable computing device is being included in a data structure of registered devices.

5. A computer-implemented method for use in enhancing security associated with services related to payment and banking accounts in connection with communication between consumers and consumer service call centers associated with the accounts, the method comprising:
   receiving, by an authentication computing device, from a call center, a request to authenticate a consumer to an account in connection with proceeding, or not, in providing one or more consumer services to the consumer regarding the account;
   soliciting, by the authentication computing device, a biometric from the consumer, at a communication device associated with the consumer, wherein the communication device is separate from the authentication computing device and is configured to display an interface to the consumer in response to the solicitation to facilitate capture of the biometric;
   receiving, by the authentication computing device, from the communication device associated with the consumer, a biometric template for the captured biometric, in response to soliciting the biometric for the consumer;
   retrieving, by the authentication computing device, reference biometric data for the consumer from a data structure separate from the communication device associated with the consumer and the authentication computing device;
   comparing, by the authentication computing device, the received biometric template to the retrieved reference biometric data for the consumer; and
   transmitting, by the authentication computing device, an authentication confirmation to the call center, when the received biometric template matches the reference biometric data, whereby the call center is able to proceed in providing the one or more of the consumer services to the consumer without soliciting additional security and/or account information from the consumer.

6. The computer-implemented method of claim 5, wherein the request includes a communication device identifier; and
   wherein soliciting the biometric from the consumer includes identifying the communication device in a data structure based on the communication device identifier.

7. The computer-implemented method of claim 6, wherein the communication device identifier includes one of a media address control (MAC) address and a mobile identification number (MIN) associated with the communication device.

8. The computer-implemented method of claim 5, wherein the request includes an account identifier for the account; and
   further comprising retrieving an application ID associated with the communication device from a data structure and identifying the communication device based on the application ID.

9. The computer-implemented method of claim 8, wherein soliciting the biometric from the consumer includes causing the interface to be displayed at the communication device.

10. The computer-implemented method of claim 5, further comprising exposing an application programming interface (API); and wherein receiving the request to authenticate the consumer includes receiving the request to authenticate the consumer via the API; and wherein transmitting the authentication confirmation to the call center includes transmitting the authentication confirmation to the call center via the API.

11. The computer-implemented method of claim 5, further comprising:

in response to the solicitation, displaying, by the communication device associated with the consumer, the interface to the consumer for use in capturing the biometric from the consumer;

receiving, by the communication device, the biometric from the consumer via the interface; and transmitting, by the communication device, a biometric template based on the received biometric to the authentication computing device.

12. The computer-implemented method of claim 11, further comprising converting, by the communication device, the received biometric to the biometric template, and deleting the received biometric.

13. A non-transitory computer readable storage medium including executable instructions for authenticating a consumer, which when executed by a processor of a communication device, cause the processor to:

receive a request for authentication of a consumer to an account associated with the consumer, in connection with facilitating a contact with a call center for providing one or more consumer services to the consumer regarding the account;

prior to an initiation of the contact with the call center, solicit a biometric indicative of the consumer, via an input device included in the communication device, wherein the communication device is linked to the account;

capture the biometric at the input device;

convert the received biometric to a template and delete the received biometric;

retrieve reference biometric data for the consumer from a data structure separate from the communication device and compare the template to the reference biometric data;

in response to a match between the template and the reference biometric data, initiate the contact and transmit an authentication code to the call center, whereby the call center is able to proceed in providing one or more of the consumer services to the consumer without soliciting additional security and/or account information from the consumer based on receipt of the authentication code; and in response to no match between the template and the reference biometric data, initiate the contact and transmit a non-authentication code to the call center, whereby the call center is able to solicit additional security and/or account information from the consumer prior to proceeding in providing the one or more consumer services to the consumer based on receipt of the non-authentication code.

* * * * *